(12) United States Patent
Smith et al.

(10) Patent No.: US 8,473,403 B2
(45) Date of Patent: Jun. 25, 2013

(54) METHODS AND SYSTEMS FOR CREATING AND TRADING STRIPS OF FINANCIAL PRODUCTS

(75) Inventors: Eileen C. Smith, Chicago, IL (US); William M. Speth, Evanston, IL (US); David Wegener, Mount Prospect, IL (US)

(73) Assignee: Chicago Board Options Exchange, Incorporated, Chicago, IL (US)

( * ) Notice: Subject to any disclaimer, the term of this patent is extended or adjusted under 35 U.S.C. 154(b) by 2 days.

(21) Appl. No.: 13/226,315

(22) Filed: Sep. 6, 2011

(65) Prior Publication Data

US 2012/0130882 A1  May 24, 2012

Related U.S. Application Data

(60) Provisional application No. 61/380,077, filed on Sep. 3, 2010.

(51) Int. Cl.
*G06Q 40/00* (2006.01)
(52) U.S. Cl.
USPC .............................................. 705/37; 705/38
(58) Field of Classification Search
USPC .................................................... 705/35–40
See application file for complete search history.

(56) References Cited

U.S. PATENT DOCUMENTS

| 4,980,826 | A | * | 12/1990 | Wagner | 705/37 |
| 5,038,284 | A | * | 8/1991 | Kramer | 705/37 |
| 5,136,501 | A | * | 8/1992 | Silverman et al. | 705/37 |

OTHER PUBLICATIONS

Eurodollar Packs and Bundles, Effective tools for dealing in strips of Eurodollar futures contracts, CME Group, Copyright 2008 (2 pages).

* cited by examiner

*Primary Examiner* — Thu Thao Havan
(74) *Attorney, Agent, or Firm* — Brinks Hofer Gilson & Lione

(57) ABSTRACT

The present invention includes a method comprising receiving a first electronic BUY STRIP order; receiving a second electronic SELL STRIP order; matching the first STRIP order with the second STRIP order, wherein the first STRIP order is a contra order to the second STRIP order; executing the matched first and second STRIP orders; generating a first plurality of tradable component financial product trades based on the executed first STRIP order; generating a second plurality of tradable component financial product trades based on the executed second STRIP order; matching the first plurality of tradable component financial product trades with the second plurality of tradable component financial product trades, wherein the first plurality of tradable component financial product trades are contra trades to the second plurality of tradable component financial product trades; and executing the matched first and second plurality of tradable component financial product trades.

12 Claims, 4 Drawing Sheets

METHODS AND SYSTEMS FOR CREATING AND TRADING STRIPS OF FINANCIAL PRODUCTS

CROSS-REFERENCE TO RELATED APPLICATIONS

This application claims the benefit of U.S. provisional patent application Ser. No. 61/380,077, filed Sep. 3, 2010, entitled "Automated Trading System and Method for Creating an Option Portfolio Replicating Implied Variance in a Single Transaction," the entire contents of which are herein incorporated by reference.

FIELD OF THE DISCLOSURE

The present disclosure relates to the trading of financial products (e.g., securities and/or derivatives). More specifically, the present disclosure relates to electronically creating a synthetic tradable financial product that when executed causes a series of non-synthetic financial products to be executed. Additionally, the present disclosure relates to the electronic exchange trading systems that allow for the routing, matching, and execution of the synthetic tradable financial product ("STRIP") and the related non-synthetic financial products.

BACKGROUND

The introduction of electronic trading mechanisms into trading venues (e.g., trading exchanges) for financial products (e.g., securities and derivative contracts ("derivatives")) has over the past several decades been an ongoing and ever accelerating process. This process has been driven, in part, by the need for both immediacy of order execution and dissemination of information. These needs have become more acute as financial product trading volumes have continued to rise and technology has allowed for greater efficiency in trading.

While the disclosure of the current application can be applied generally to all types of financial product trading (e.g., the trading of securities, futures contracts ("futures"), options contracts ("options"), or any other type of tradable financial product), the present disclosure will focus primarily on the workings of a derivative exchange, such as a futures or options exchange. A derivative is a financial instrument whose value depends at least in part on the value and/or characteristic(s) of another security, known as an underlying asset (e.g., an index, security, derivative, etc. . . . ). Two exemplary and well known derivatives are options and futures.

Derivatives, such as options and futures, may be traded at organized derivative exchanges (e.g., the Chicago Board Options Exchange, Incorporated ("CBOE")). Generally, modern trading exchanges have exchange specific computer and electronic communication systems that allow for the electronic submission, execution and reporting of orders via electronic communication networks, such as the Internet. These systems are often optimized for maximum efficiency, speed, and usability. The optimization for efficiency, speed, and usability is especially important as modern trading techniques continue to advance and become more complex.

In derivatives trading (e.g., the trading of options) it is possible to execute multiple parts of an order that work in concert to create a particular investment position. This strategy may be referred to as a "spread" order, and the multiple parts of the order may be referred to as "legs." Options exchanges, such as CBOE, offer a spread order type for executing a complex spread of up to four legs.

For example, a trader might select two legs (e.g., BUY leg and SELL leg) to be included in a spread order. The spread order is then sent to an options exchange for execution. At CBOE, a spread order is placed into a complex order book that is separate from the order book that contains non-complex orders. Spread orders residing on the complex order book can trade against each other and/or the legs of the spread orders residing on the complex order book can trade against orders residing on the non-complex order book.

In executing the legs of a spread order, exchanges must satisfy the rules governing the trading of individual orders. A spread order can only be executed if all of the legs of the order can be filled and the legs can only be filled if the rules that govern the trading of individual orders are satisfied. That is, if any one of the legs of a spread order is unable to be filled, the entire spread order cannot be executed. Thus, the difficulty in executing a spread order increases significantly as the number of legs in the order increases.

Additionally, part of the difficulty in executing spread orders is properly choosing and pricing the various legs that make up the order in such a way that the order can execute. For example, it is entirely possible that two spread orders residing on a complex order book could have contra positions that fill the legs of both orders. However, because the pricing of one or more of the legs fails to satisfy the rules governing the trading of individual orders the spread order cannot execute.

Thus, there is a need for a system and method for creating a synthetic order that would allow contra positions of multi-component orders to execute based on overall price of the multi-component order and not on the prices of the individual components. Additionally, there is a need for a system and method for creating a synthetic order that allows for execution without consideration of the "executability" of the non-synthetic components associated with the synthetic order type. Additionally, there is a need for a system and method for determining what components should be included in a synthetic multi-component order. Additionally, there is a need for a system and method for processing a synthetic multi-component order efficiently such that orders having tens, hundreds, or thousands of legs could be executed in one transaction.

BRIEF SUMMARY

According to one embodiment of the present invention, a computer-implemented method for trading STRIP orders is provided. The method includes receiving, by an exchange computer, a first electronic STRIP order, wherein the first electronic STRIP order is a BUY order. The method further includes, receiving, by an exchange computer, a second electronic STRIP order, wherein the second electronic STRIP order is a SELL order. The method further includes, matching, by an exchange computer, the first STRIP order with the second STRIP order, wherein the first STRIP order is a contra order to the second STRIP order. The method further includes, executing, by an exchange computer, the matched first and second STRIP orders. The method further includes, generating, by an exchange computer, a first plurality of tradable component financial product trades based on the executed first STRIP order. The method further includes, generating, by an exchange computer, a second plurality of tradable component financial product trades based on the executed second STRIP order. The method further includes, matching, by an exchange computer the first plurality of tradable component financial product trades with the second plurality of tradable component financial product trades, wherein the first plurality of tradable component financial product trades are contra trades to the second plurality of tradable component financial product trades. The method further includes, executing, by an exchange computer, the matched first and second plurality of tradable component financial product trades.

DETAILED DESCRIPTION OF THE PREFERRED EMBODIMENTS

The embodiments of the present disclosure are used to trade synthetic "STRIP" orders. STRIP orders allow for the execution of multiple non-synthetic component trades without regard to the ability to execute each of the multiple component trades. According to an embodiment of the present invention, a STRIP order is a single synthetic order that after execution causes the execution of a series or basket of non-synthetic trades. Unlike traditional methods of executing multi-component orders (i.e., spread orders), STRIP orders are executed as a single transaction without regard to the related basket of non-synthetic trades. Thus, STRIP orders can be executed even if one or more of the non-synthetic trades contained in the related basket could not be executed according to traditional methods. According to an embodiment of the present invention component trades and not component orders are generated based on the STRIP orders. Thus, the STRIP orders of the present invention can be executed without involving the use of complex orders, such as spread orders.

Figure 1:
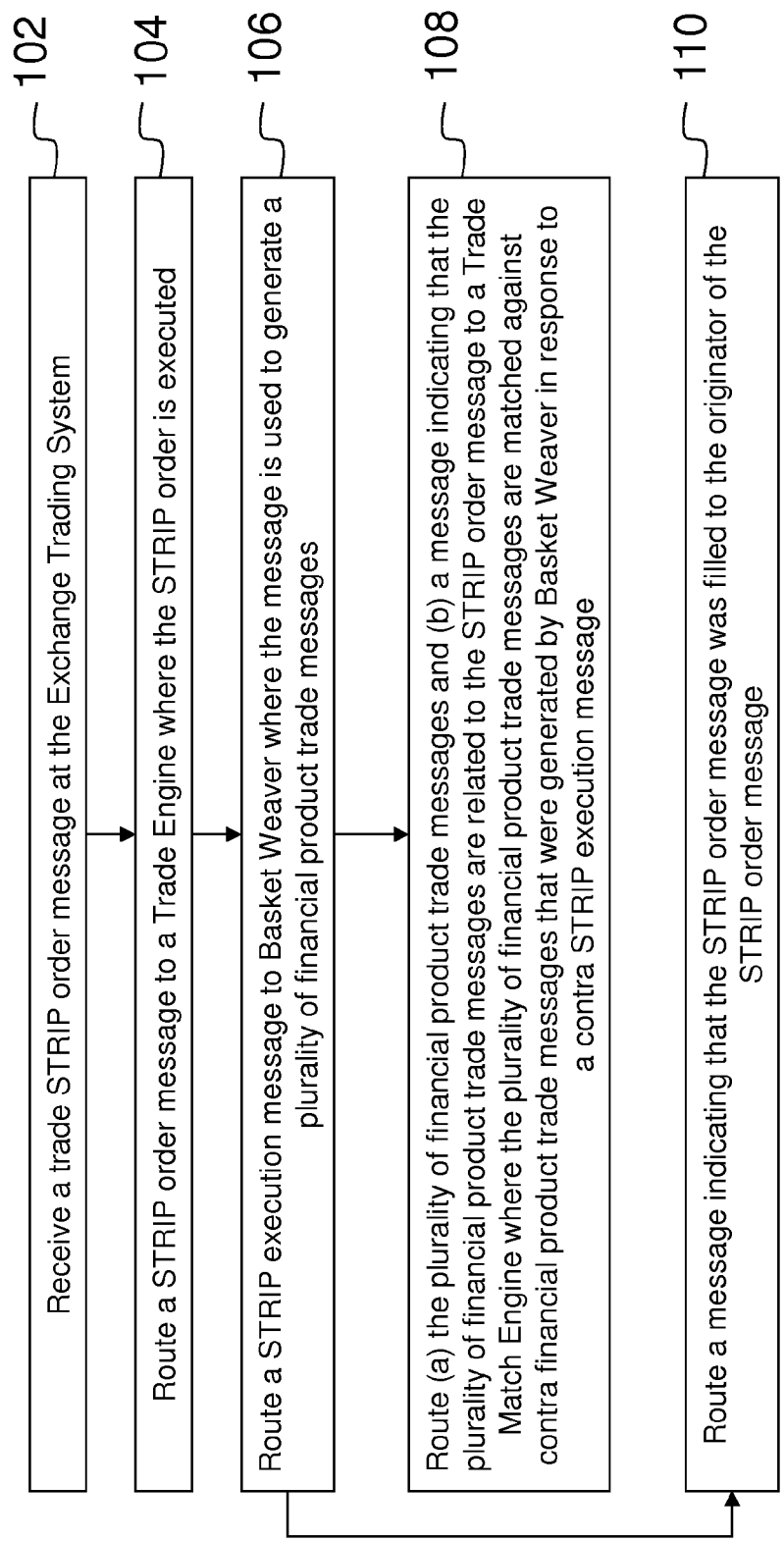
FIG. 1 is a flow diagram of a method of executing a synthetic STRIP order.

FIG. 1 is a flow diagram of an exemplary method for executing a STRIP order. At step 102 a trade STRIP order message is received at an exchange trading system. This trade STRIP order message is either a BUY or SELL order message. According to an embodiment of the present invention the trade STRIP order message is received electronically from a customer's electronic trade management system (e.g., order management system, execution management system, or any other system capable of routing electronic trade order messages to execution facilities).

After receiving the trade STRIP order message, at step 104 the message is routed within the exchange trading system to a trade engine where the STRIP order is executed. According to an embodiment of the present invention, the STRIP order message is received and "booked" at the exchange trading system. An order is booked at an exchange if the order is stored on an order book. An order stored on an order book is eligible for execution against a contra order (i.e., an order that fulfills the pending booked order). According to an embodiment of the present invention, STRIP orders are booked on a separate and distinct order book from all other order types. According to an embodiment of the present invention, STRIP orders are booked as individual orders, in similar fashion to the way in which independent orders are booked. Inside of an exchange system, if an order and its contra order are eligible for execution, the orders are routed to a trade engine and executed.

At step 106, after execution at the trade engine, a STRIP execution message is routed to an order expansion system or "basket weaver." The basket weaver system generates a plurality of non-synthetic financial product trade messages in response to the receiving of the STRIP execution message. According to an embodiment of the present invention, these generated non-synthetic financial product trade messages are not booked and are not eligible for individual execution.

Additionally, in response to step 106, at step 110 a message indicating that the STRIP order message was filled is sent to the originator of the STRIP order message (i.e., a fill message is sent back to the customer's electronic trade management system). According to an embodiment of the present invention, this fill message is the only fill message sent back to the originator of the STRIP order message. According to another embodiment of the present invention, fill messages are generated for each order message (i.e., both STRIP order message and the non-synthetic financial product trade messages). Additionally, according to different embodiments, the portion of the exchange system that provides the fill reports includes, but is not limited to: an order handling system, a trade engine, or a basket weaver.

At step 108, the generated plurality of non-synthetic financial product trade messages and a message indicating that the plurality of non-synthetic financial product trade messages are related to the executed STRIP order message are routed to an electronic trade match engine. At the electronic trade match engine the plurality of non-synthetic financial product trade messages are matched with their contra trade messages that were generated in response to the contra STRIP order message. At this point the STRIP order has been executed and filled.

Embodiments of the present invention can be integrated with financial exchange systems and/or other known financial industry systems. Both financial exchange systems and other known financial industry systems utilize a combination of computer hardware (e.g., client and server computers, which may include computer processors, memory, storage, input and output devices, and other known components of computer systems; electronic communication equipment, such as electronic communication lines, routers, switches, etc.; electronic information storage systems, such as network-attached storage and storage area networks) and computer software (i.e., the instructions that cause the computer hardware to function in a specific way) to achieve the desired system performance. It should be noted that financial exchange systems may be floor-based open outcry systems, pure electronic systems, or some combination of floor-based open outcry and pure electronic systems.

Figure 2:
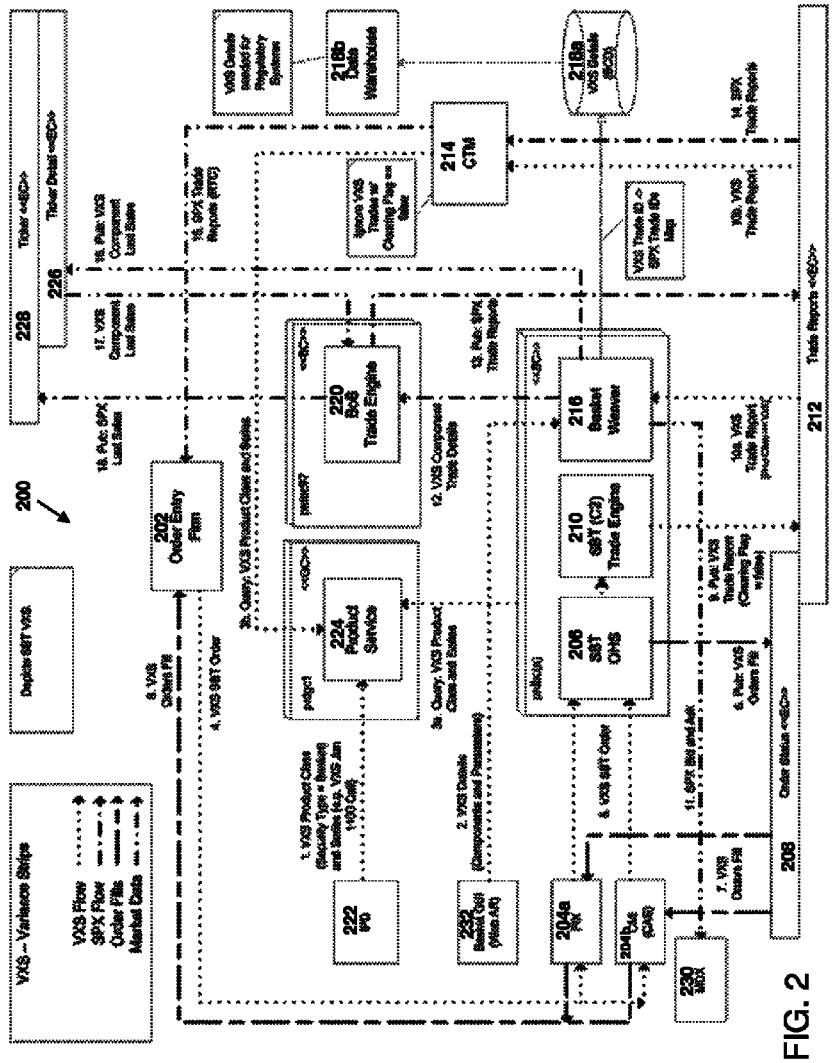
FIG. 2 is a diagram of a financial exchange's computerized trading system.

FIG. 2 illustrates an exemplary electronic trading System 200 which may be used for trading a STRIP order, according to the present disclosure. One having ordinary skill in the art would readily understand that System 200, as described in detail below, would be implemented utilizing a combination of computer hardware and software, as described in the paragraph above. It will be appreciated that the described systems may implement the methods described below. In describing the methods and systems of the present disclosure, options will be focused on. One having ordinary skill in the art would readily understand that the subject matter described herein could be used to execute any type of financial product (e.g., securities, futures, etc. . . . ).

The System 200 includes components operated by an exchange. It is understood that the execution and reporting of financial product orders will likely utilize components and systems operated by those who access the System 200 as well as clearing systems operated by other entities. While the components of System 200 are shown individually, it is envisioned that these components could be combined while maintaining their functionality.

FIG. 2 depicts the flow of synthetic variance STRIP orders ("VXS"), as described in further detail below, and their component non-synthetic options of the S&P 500 ("SPX") through an exchanges computerized trading system. However, the system shown in FIG. 2 could be used to trade and/or execute any STRIP type order. It should be noted that the processes and systems shown in FIG. 2 could be contained on one or many specially configured financial exchange computer systems. According to an embodiment of the present invention, these specially configured financial exchange computer systems are networked together and are accessible via one or more electronic communication networks, such as the Internet.

Initially, System 200 is used to create the STRIP financial product. The STRIP product is created at the Integrated Product Database 222. Information from the Integrated Product Database 222 is fed into the Product Service Module 224, which is queried by the core trade systems comprising the Order Handling System 206, the Trade Engine 210, and the Basket Weaver 216 in order to effectuate trading of STRIP orders (as well as other order types).

System 200 includes Order Entry Firm 202, which serves as an access point for users to enter STRIP order messages into System 200. STRIP order messages may be entered at Order Entry Firm 202 in a variety of ways including, but not limited to: direct screen entry, use of an order management system, use of an execution management system, or any other electronic order entry method. Order messages entered into Order Entry Firm 202 are routed either to the FIX Module 204a or the CMi Module 204b. The FIX Module 204a and the CMi Module 204b serve as entry points into System 200 for messages in either the FIX or CMi format. If an incoming message is in the FIX format, the FIX Module 204a facilitates the translation of the message into CMi format.

Once the STRIP order message is translated into a common system format at FIX Module 204a or the CMi Module 204b the STRIP order message is sent to the Order Handling System 206. If the STRIP order message is filled, a fill Order Status Message 208 is sent to the Order Entry Firm 202 via either the FIX Module 204a or the CMi Module 204b.

The STRIP order message is sent from the Order Handling System 206 to the Trade Engine 210 for execution. Once executed, the STRIP execution message is routed as a Trade Report 212 to the Continuous Trade Match 214 where the STRIP execution message is ignored. Additionally, the STRIP execution message is routed as a Trade Report 212 to the Basket Weaver 216.

At the Basket Weaver 216, the incoming STRIP execution message is identified and expanded into a plurality of component non-synthetic financial product trade messages. The details of what component non-synthetic financial product trade messages should be generated from the STRIP order message are in memory at Basket Weaver 216. This information is backed-up and stored using the Business Cluster Database 218a and the Data Warehouse 218b.

The plurality of component non-synthetic financial product trade messages are then routed to a second Trade Engine 220. From the second Trade Engine 220, the plurality of component non-synthetic financial product trade messages are then routed as Trade Reports 212 to the Continuous Trade Match 214 where the non-synthetic financial products are matched with their contra trades that were expanded from a contra STRIP order. From the Continuous Trade Match 214 the trade report is routed back to the Order Entry Firm 202.

Additionally, market data (e.g., execution information) from Basket Weaver 216 is communicated to the Ticker Detail 226. From the Ticker Detail 226, the market data is transmitted to the second Trade Engine 220 and then to the Ticker 228 for public dissemination. Additionally, market data is transmitted to the Market Data module 230. The Basket Graphical User Interface 232 serves as an input tool to ensure that the correct components are being executed for the next trading sessions STRIP orders.

Variance STRIP

One embodiment of a STRIP order, according to the present invention and described above, would be a Variance STRIP that allows investors to trade an option basket (i.e., the non-synthetic trade components of the synthetic STRIP order) replicating the implied variance of a group of financial products or an index, in a single transaction. For example, a Variance STRIP could be used to trade an option basket that replicates the implied variance of the S&P 500 (i.e., VXS). Variance STRIPS represent a fundamental shift in the executing of multi-component variance/volatility strategies. In particular, Variance STRIP pricing is not the aggregate of the component non-synthetic financial products associated with the Variance STRIP. Rather using Variance STRIPS it is possible to isolate the variance/volatility of a replicating option portfolio, and thus it is possible to "price" the replicating option portfolio in terms of aggregate volatility rather than aggregate price.

According to an embodiment of the present invention, prices for Variance STRIP trades will be quoted in volatility terms and trade quantity will be expressed in contracts, where each contract represent a fixed vega notional amount (e.g., 24.37 bid for $100,000 vega). Vega is the amount by which an option price moves in response to a one point change in the implied volatility. According to an embodiment of the present invention, the component options are a portfolio are out-of-the-money SPX puts and calls centered around an at-the-money ($K_0$) strike price and all of the options have the same expiration date.

According to an embodiment of the present invention, each day after the market close, the exchange will publish information that will define the constituent non-synthetic financial products (i.e., the basket of options) for Variance STRIP trades executed on the following trading day. According to other embodiments of the present invention, the time periods by which the STRIP components are set could be any other preset time period (e.g., multi-day, week, month, year, etc. . . . ). The Variance STRIP parameters published by the exchange may be in effect for the entire next trading session. Fill reports, end-of day summary reports and account statements will reflect activity and positions in SPX option series.

According to an embodiment of the present invention, the matched Variance STRIP trades are used to generate the component SPX option series trades according to a predefined algorithm, which is discussed in further detail below. According to an embodiment of the present invention, the algorithm used to generate the component financial products could be based on the VIX methodology, which is used to generate CBOE's published VIX index. It is envisioned that other algorithms could be used in conjunction with the subject matter disclosed herein.

According to an embodiment of the present invention, the exchange may offer at least two varieties of Variance STRIPS, including: "Full-STRIP," consisting of all series in the strike range and "Meat," consisting of strike prices ±10% of $K_0$. Other types of Variance STRIP trades, such as "Wings," are contemplated. The following is an example of a DEC 2010 variance "Full-STRIP" trade on Tuesday, Nov. 10, 2009, according to the present invention.

After the close on Monday, Nov. 9, 2009, the exchange publishes the following parameters for SPX Variance STRIPS effective for the next trade date—Tuesday, Nov. 10. The information defining the SPX options effective for DEC 2010 variance is highlighted below in Table 1:

Table 1

TABLE 1

| SPX Expiration | Strike Range | $K_0$ | Min. Strike Interval | Forward SPX |
|---|---|---|---|---|
| December 2009 | 650-1150 | 1075 | 25 | 1078.01 |
| January 2010 | 600-1200 | 1075 | 25 | 1077.91 |
| March 2010 | 550-1250 | 1075 | 25 | 1077.71 |
| June 2010 | 450-1400 | 1075 | 25 | 1077.41 |
| September 2010 | 350-1500 | 1075 | 25 | 1077.11 |
| December 2010 | 200-1700 | 1075 | 25 | 1076.81 |
| June 2011 | 100-1800 | 1075 | 25 | 1076.21 |

In addition, the following information needs to be known as of trade date: Time to DEC 2010 Expiration (T) is 1.10137 years (402 days); and Risk-Free Interest Rate to DEC 2010 (R): is 0.388% (Interest rate on U.S. Treasury Bill maturing Dec. 13, 2010). The prevailing prices for DEC 2010 SPX options are shown in Table 2 below:

TABLE 2

| P/C | Strike Price (K) | Bid | Ask | Mid-Quote | ΔK |
|---|---|---|---|---|---|
| p | 200 | $0.100 | $0.150 | $0.125 | 50 |
| p | 250 | $0.100 | $0.250 | $0.175 | 50 |
| p | 300 | $0.400 | $0.800 | $0.600 | 37.5 |
| p | 325 | $0.450 | $1.050 | $0.750 | 25 |
| p | 350 | $0.700 | $1.300 | $1.000 | 37.5 |
| p | 400 | $1.450 | $2.050 | $1.750 | 37.5 |
| p | 425 | $1.800 | $2.700 | $2.250 | 25 |
| p | 450 | $2.350 | $3.300 | $2.825 | 25 |
| p | 475 | $3.100 | $4.000 | $3.550 | 25 |
| p | 500 | $4.000 | $4.400 | $4.200 | 25 |
| p | 525 | $4.700 | $5.900 | $5.300 | 25 |
| p | 550 | $5.800 | $7.000 | $6.400 | 25 |
| p | 575 | $7.100 | $8.200 | $7.650 | 25 |
| p | 600 | $8.700 | $9.700 | $9.200 | 37.5 |
| p | 650 | $11.900 | $13.700 | $12.800 | 37.5 |
| p | 675 | $4.300 | $15.700 | $15.000 | 25 |
| p | 700 | $16.900 | $18.200 | $17.550 | 25 |
| p | 725 | $19.400 | $21.300 | $20.350 | 25 |
| p | 750 | $22.400 | $24.300 | $23.350 | 25 |
| p | 775 | $25.700 | $27.800 | $26.750 | 25 |
| p | 800 | $29.300 | $31.700 | $30.500 | 25 |
| p | 825 | $33.300 | $35.800 | $34.550 | 25 |
| p | 850 | $37.500 | $40.400 | $38.950 | 25 |
| p | 875 | $42.400 | $45.600 | $44.000 | 25 |
| p | 900 | $49.500 | $51.600 | $50.550 | 25 |
| p | 925 | $54.200 | $58.100 | $56.150 | 25 |
| p | 950 | $61.000 | $65.200 | $63.100 | 25 |
| p | 975 | $68.600 | $72.500 | $70.550 | 25 |
| p | 1000 | $77.000 | $80.800 | $78.900 | 25 |
| p | 1025 | $85.500 | $89.900 | $87.700 | 25 |
| p | 1050 | $94.600 | $99.800 | $97.200 | 25 |
| P($K_0$) | 1075 | $105.200 | $110.000 | $107.600 | 25 |
| C($K_0$) | 1075 | $107.000 | $111.000 | $109.400 | |
| c | 1100 | $94.100 | $98.900 | $96.500 | 25 |
| c | 1125 | $81.200 | $86.100 | $83.650 | 25 |

TABLE 2-continued

| P/C | Strike Price (K) | Bid | Ask | Mid-Quote | ΔK |
|---|---|---|---|---|---|
| c | 1150 | $69.500 | $74.700 | $72.100 | 25 |
| c | 1175 | $59.300 | $63.900 | $61.600 | 25 |
| c | 1200 | $50.100 | $54.300 | $52.200 | 25 |
| c | 1225 | $41.300 | $45.700 | $43.500 | 25 |
| c | 1250 | $34.200 | $38.100 | $36.150 | 25 |
| c | 1275 | $28.000 | $31.400 | $29.700 | 25 |
| c | 1300 | $22.500 | $25.500 | $24.000 | 25 |
| c | 1325 | $18.400 | $20.200 | $19.300 | 25 |
| c | 1350 | $14.400 | $16.100 | $15.250 | 25 |
| c | 1375 | $11.100 | $12.900 | $12.000 | 25 |
| c | 1400 | $8.500 | $9.700 | $9.100 | 25 |
| c | 1425 | $6.200 | $7.400 | $6.800 | 25 |
| c | 1450 | $4.500 | $5.600 | $5.050 | 37.5 |
| c | 1500 | $2.350 | $3.300 | $2.825 | 50 |
| c | 1550 | $1.200 | $1.800 | $1.500 | 50 |
| c | 1600 | $0.600 | $1.200 | $0.900 | 75 |
| c | 1700 | $0.100 | $0.700 | $0.400 | 100 |

When these option prices are inputted into CBOE's VIX formula:

$$\sigma^2 = \frac{2}{T}\sum_i \frac{\Delta K_i}{K_i^2} e^{RT} Q(K_i) - \frac{1}{T}\left[\frac{F}{K_0} - 1\right]^2 \quad (1)$$

Where:
$\sigma^2$ is the Variance (volatility-squared); VIX=$\sigma \times 100$;
T is the Time to expiration;
F is the Forward SPX level;
$K_0$ is the Variance STRIP centering strike price;
$K_i$ is the Strike price of $i^{th}$ option;
$\Delta K_i$ is the Interval between strike prices;
R is the Risk-free interest rate to expiration; and
$Q(K_i)$ is the Price of option with strike $K_i$, In this example, the volatility based on mid-quote prices (according to CBOE's VIX methodology) for DEC 2010 SPX is 27.78, the volatility based on SPX option bid prices 27.07 and volatility based on ask prices 28.46 together provide a volatility bid-ask spread of 17.07-28.46.

The Variance STRIP Trade

According to an embodiment of the invention, a trade and execution of a Variance STRIP can be achieved utilizing the system set forth in FIG. 2 and described in detail above. In this example, which can be implemented using the afore described systems, a broker (or other financial professional) receives the following Variance STRIP order: Sell $100,000 SPX DEC 2010 vega at 27.50. A second broker holds the contra Variance STRIP order: Buy $250,000 SPX DEC 2010 vega at 27.00. The parties agree to a trade price of 27.25 for $100,000 vega. The matched Variance STRIP trade is then submitted to a post-trade process/system (e.g., Basket Weaver) that creates a series of matched trades in all of the SPX option series comprising the Variance STRIP on that day. As described above, the actual matching and execution of the variance STRIP requires the interplay of numerous computerized exchange (and/or other financial) systems.

Deconstruction Algorithm

As noted above, many different algorithms can be used to generate the component non-synthetic financial product trades from the synthetic STRIP trade, this disclosure will focus on the algorithm that is used to generate component non-synthetic SPX option trades from a Variance STRIP that is used to replicate the implied variance of the S&P 500.

According to an embodiment of the present invention, the algorithm used to generate the component non-synthetic SPX options may include a 2-step process. The first step may assign the number of SPX option contracts traded at each strike ($C_i$) as a function of the vega notional value (size) and volatility (price), along with the option strike price, risk-free interest rate and time to expiration. The second step may assign a trade price for each option—$Q(K_i)$—that involves fixing a baseline implied volatility "smile" for the constituent SPX options and then iteratively shifting the baseline volatility curve up or down and feeding the resulting theoretical option prices back into the CBOE's VIX methodology until the value generated using the VIX methodology matches the variance STRIP trade price.

According to an embodiment of the present invention, the following formula generally defines the trade quantity for each series in the Variance STRIP:

$$C_i = \frac{2}{T}\left[\frac{\Delta K_i}{K_i^2}\right]e^{RT} \times \left[\frac{\text{vega notional}}{2\times\sigma}\right] \times 100 \quad (2)$$

For example, the trade quantity for the SPX DEC 2010 200 put ($C_{200\ Put}$) is given, using the values above, by:

$$C_{200Put} = \frac{2}{T}\left[\frac{\Delta K_{200}}{K_{200}^2}\right]e^{RT} \times \left[\frac{\text{vega notional}}{2\times\sigma}\right] \times 100$$

$$C_{200Put} = \frac{2}{1.10137}\left[\frac{50}{200^2}\right]1.00428 \times \left[\frac{100{,}000}{2\times27.25}\right] \times 100 = 418.2791$$

Since there are no fractional option contracts, the value for $C_{200\ Put}$ is rounded to 418.

According to an embodiment of the present invention, the same calculation is then conducted for each SPX option series comprising the Variance STRIP. Results are shown in the table 3 below. Because this calculation needs to be done repetitively and correctly, the calculation is performed by an exchange computer. It should be noted that the trade quantity for the $K_0$ strike reflects the sum of 1075 puts and 1075 calls.

TABLE 3

| P/C | Strike Price (K) | ΔK | $\left[\frac{\text{vega notional}}{2\times\sigma}\right]$ "Variance Units" | Contracts ($C_i$) |
|---|---|---|---|---|
| p | 200 | 50 | 1834.86 | 418 |
| p | 250 | 50 | 1834.86 | 268 |
| p | 300 | 37.5 | 1834.86 | 139 |
| p | 325 | 25 | 1834.86 | 79 |
| p | 350 | 37.5 | 1834.86 | 102 |
| p | 400 | 37.5 | 1834.86 | 78 |
| p | 425 | 25 | 1834.86 | 46 |
| p | 450 | 25 | 1834.86 | 41 |
| p | 475 | 25 | 1834.86 | 37 |
| p | 500 | 25 | 1834.86 | 33 |
| p | 525 | 25 | 1834.86 | 30 |
| p | 550 | 25 | 1834.86 | 28 |
| p | 575 | 25 | 1834.86 | 25 |
| p | 600 | 37.5 | 1834.86 | 35 |
| p | 650 | 37.5 | 1834.86 | 30 |
| p | 675 | 25 | 1834.86 | 18 |

TABLE 3-continued

| P/C | Strike Price (K) | ΔK | $\left[\frac{\text{vega notional}}{2\times\sigma}\right]$ "Variance Units" | Contracts ($C_i$) |
|---|---|---|---|---|
| p | 700 | 25 | 1834.86 | 17 |
| p | 725 | 25 | 1834.86 | 16 |
| p | 750 | 25 | 1834.86 | 15 |
| p | 775 | 25 | 1834.86 | 14 |
| p | 800 | 25 | 1834.86 | 13 |
| p | 825 | 25 | 1834.86 | 12 |
| p | 850 | 25 | 1834.86 | 12 |
| p | 875 | 25 | 1834.86 | 11 |
| p | 900 | 25 | 1834.86 | 10 |
| p | 925 | 25 | 1834.86 | 10 |
| p | 950 | 25 | 1834.86 | 9 |
| p | 975 | 25 | 1834.86 | 9 |
| p | 1000 | 25 | 1834.86 | 8 |
| p | 1025 | 25 | 1834.86 | 8 |
| p | 1050 | 25 | 1834.86 | 8 |
| P($K_0$), C($K_0$) | 1075 | 25 | 1834.86 | 7 |
| c | 1100 | 25 | 1834.86 | 7 |
| c | 1125 | 25 | 1834.86 | 7 |
| c | 1150 | 25 | 1834.86 | 6 |
| c | 1175 | 25 | 1834.86 | 6 |
| c | 1200 | 25 | 1834.86 | 6 |
| c | 1225 | 25 | 1834.86 | 6 |
| c | 1250 | 25 | 1834.86 | 5 |
| c | 1275 | 25 | 1834.86 | 5 |
| c | 1300 | 25 | 1834.86 | 5 |
| c | 1325 | 25 | 1834.86 | 5 |
| c | 1350 | 25 | 1834.86 | 5 |
| c | 1375 | 25 | 1834.86 | 4 |
| c | 1400 | 25 | 1834.86 | 4 |
| c | 1425 | 25 | 1834.86 | 4 |
| c | 1450 | 37.5 | 1834.86 | 6 |
| c | 1500 | 50 | 1834.86 | 7 |
| c | 1550 | 50 | 1834.86 | 7 |
| c | 1600 | 75 | 1834.86 | 10 |
| c | 1700 | 100 | 1834.86 | 12 |

Assigning Trade Prices

Figure 4:
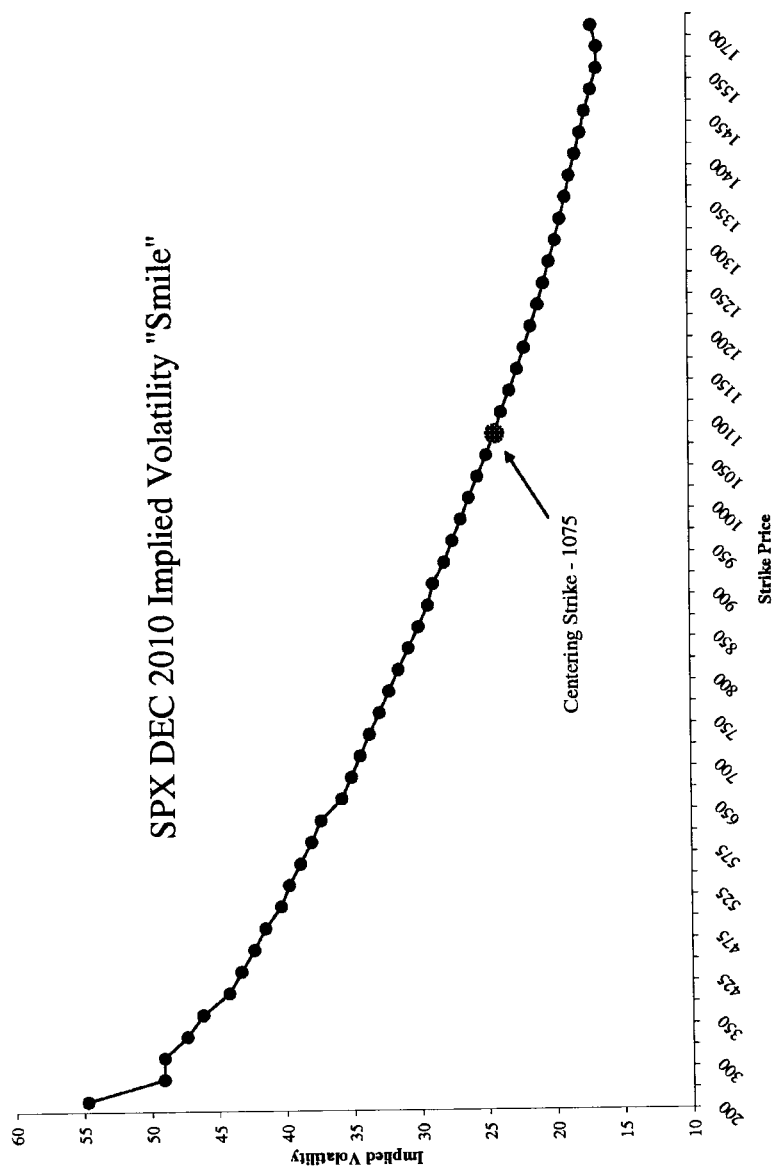
FIG. 4 is a graph illustrating an example baseline volatility curve or "smile" of implied volatility as a function of strike price for SPX DEC 2010 options.

According to an embodiment of the present invention, the first step in the process of assigning trade prices to non-synthetic component SPX options is to determine a baseline volatility curve or "smile"—implied volatility as a function of strike price. This can be done by backing out implied volatility levels for mid-quote option prices using a Black Model relative to the SPX forward level to DEC 2010 expiration as shown in FIG. 4.

The next step is to systematically reduce the mid-quote implied volatilities for all the SPX options comprising the Variance STRIP by plugging in the resulting theoretical prices into the VIX formula such that the resulting volatility level (calculated using CBOE's VIX methodology) matches the Variance STRIP trade price of 27.25. This is accomplished by shifting the implied volatilities of each option by the same amount, in this case −0.4061 volatility points. When the theoretical option prices are fed back into the VIX formula, the resulting value is 27.25033, about 0.12% different than the target Variance STRIP trade price. Again, given the repetitive nature of these calculations, it is envisioned that the calculations are performed using an exchange computer.

With trade quantities and trade prices assigned, shown in Table 3 are 51 matched trades in all the SPX series for the Variance STRIP. In all, a total of 1,703 SPX options contracts are traded, with a total portfolio value of just over $1.35 million.

TABLE 3

| Strike Price | Mid-quote Option Price | "Baseline" Implied Volatility | Adjusted Implied Volatility | Adjusted Option Price | Trade Price (rounded) | Trade Quantity | Trade Value |
|---|---|---|---|---|---|---|---|
| 200 | $ 0.125 | 54.75 | 54.289 | $ 0.1138 | $ 0.11 | 418 | $ 4,598 |
| 250 | $ 0.175 | 49.08 | 48.619 | $ 0.1581 | $ 0.16 | 268 | $ 4,288 |
| 300 | $ 0.600 | 49.06 | 48.599 | $ 0.5531 | $ 0.55 | 139 | $ 7,645 |
| 325 | $ 0.750 | 47.34 | 46.879 | $ 0.6917 | $ 0.69 | 79 | $ 5,451 |
| 350 | $ 1.000 | 46.17 | 45.709 | $ 0.9245 | $ 0.92 | 102 | $ 9,384 |
| 400 | $ 1.750 | 44.23 | 43.769 | $ 1.6269 | $ 1.63 | 78 | $12,714 |
| 425 | $ 2.250 | 43.30 | 42.839 | $ 2.0973 | $ 2.10 | 46 | $ 9,660 |
| 450 | $ 2.825 | 42.34 | 41.879 | $ 2.6404 | $ 2.64 | 41 | $10,824 |
| 475 | $ 3.550 | 41.50 | 41.039 | $ 3.3274 | $ 3.33 | 37 | $12,321 |
| 500 | $ 4.200 | 40.32 | 39.859 | $ 3.9373 | $ 3.94 | 33 | $13,002 |
| 525 | $ 5.300 | 39.71 | 39.249 | $ 4.9819 | $ 4.98 | 30 | $14,940 |
| 550 | $ 6.400 | 38.88 | 38.419 | $ 6.0390 | $ 6.04 | 28 | $16,912 |
| 575 | $ 7.650 | 38.03 | 37.569 | $ 7.2253 | $ 7.23 | 25 | $18,075 |
| 600 | $ 9.200 | 37.32 | 36.859 | $ 8.7117 | $ 8.71 | 35 | $30,485 |
| 650 | $ 12.800 | 35.78 | 35.319 | $ 12.1604 | $ 12.16 | 30 | $36,480 |
| 675 | $ 15.000 | 35.06 | 34.599 | $ 14.2858 | $ 14.29 | 18 | $25,722 |
| 700 | $ 17.550 | 34.38 | 33.919 | $ 16.7377 | $ 16.74 | 17 | $28,458 |
| 725 | $ 20.350 | 33.70 | 33.239 | $ 19.4837 | $ 19.48 | 16 | $31,168 |
| 750 | $ 23.350 | 32.94 | 32.479 | $ 22.3787 | $ 22.38 | 15 | $33,570 |
| 775 | $ 26.750 | 32.22 | 31.759 | $ 25.6753 | $ 25.68 | 14 | $35,952 |
| 800 | $ 30.500 | 31.50 | 31.039 | $ 29.3235 | $ 29.32 | 13 | $38,116 |
| 825 | $ 34.550 | 30.75 | 30.289 | $ 33.2692 | $ 33.27 | 12 | $39,924 |
| 850 | $ 38.950 | 30.00 | 29.539 | $ 37.6119 | $ 37.61 | 12 | $45,132 |
| 875 | $ 44.000 | 29.30 | 28.839 | $ 42.5427 | $ 42.54 | 11 | $46,794 |
| 900 | $ 50.550 | 28.90 | 28.439 | $ 48.9753 | $ 48.98 | 10 | $48,980 |
| 925 | $ 56.150 | 28.05 | 27.589 | $ 54.4419 | $ 54.44 | 10 | $54,440 |
| 950 | $ 63.100 | 27.45 | 26.989 | $ 61.3595 | $ 61.36 | 9 | $55,224 |
| 975 | $ 70.550 | 26.80 | 26.339 | $ 68.7231 | $ 68.72 | 9 | $61,848 |
| 1000 | $ 78.900 | 26.20 | 25.739 | $ 76.9612 | $ 76.96 | 8 | $61,568 |
| 1025 | $ 87.700 | 25.55 | 25.089 | $ 85.7121 | $ 85.71 | 8 | $68,568 |
| 1050 | $ 97.200 | 24.90 | 24.439 | $ 95.2192 | $ 95.22 | 8 | $76,176 |
| 1075 | $108.500 | 24.25 | 23.789 | $106.4275 | $106.43 | 7 | $74,501 |
| 1100 | $ 96.500 | 23.80 | 23.339 | $ 94.4860 | $ 94.49 | 7 | $66,143 |
| 1125 | $ 83.650 | 23.15 | 22.689 | $ 81.6359 | $ 81.64 | 7 | $57,148 |
| 1150 | $ 72.100 | 22.58 | 22.119 | $ 70.0620 | $ 70.06 | 6 | $42,036 |
| 1175 | $ 61.600 | 22.05 | 21.589 | $ 59.6027 | $ 59.60 | 6 | $35,760 |
| 1200 | $ 52.200 | 21.55 | 21.089 | $ 50.2163 | $ 50.22 | 6 | $30,132 |
| 1225 | $ 43.500 | 21.03 | 20.569 | $ 41.6905 | $ 41.69 | 6 | $25,014 |
| 1250 | $ 36.150 | 20.60 | 20.139 | $ 34.4428 | $ 34.44 | 5 | $17,220 |
| 1275 | $ 29.700 | 20.18 | 19.719 | $ 28.1053 | $ 28.11 | 5 | $14,055 |
| 1300 | $ 24.000 | 19.73 | 19.269 | $ 22.5059 | $ 22.51 | 5 | $11,255 |
| 1325 | $ 19.300 | 19.37 | 18.909 | $ 17.9723 | $ 17.97 | 5 | $ 8,985 |
| 1350 | $ 15.250 | 18.98 | 18.519 | $ 14.0597 | $ 14.06 | 5 | $ 7,030 |
| 1375 | $ 12.000 | 18.66 | 18.199 | $ 10.9591 | $ 10.96 | 4 | $ 4,384 |
| 1400 | $ 9.100 | 18.23 | 17.769 | $ 8.1972 | $ 8.20 | 4 | $ 3,280 |
| 1425 | $ 6.800 | 17.84 | 17.379 | $ 6.0502 | $ 6.05 | 4 | $ 2,420 |
| 1450 | $ 5.050 | 17.50 | 17.039 | $ 4.4259 | $ 4.43 | 6 | $ 2,658 |
| 1500 | $ 2.825 | 17.05 | 16.589 | $ 2.4037 | $ 2.40 | 7 | $ 1,680 |
| 1550 | $ 1.500 | 16.63 | 16.169 | $ 1.2367 | $ 1.24 | 7 | $   868 |
| 1600 | $ 0.900 | 16.60 | 16.139 | $ 0.7225 | $ 0.72 | 10 | $   720 |
| 1700 | $ 0.400 | 17.00 | 16.539 | $ 0.3092 | $ 0.31 | 12 | $   372 |
| Total Contracts | | | | | | 1,703 | |
| Total Portfolio Value | | | | | | | $1,365,783 |

Figure 3:
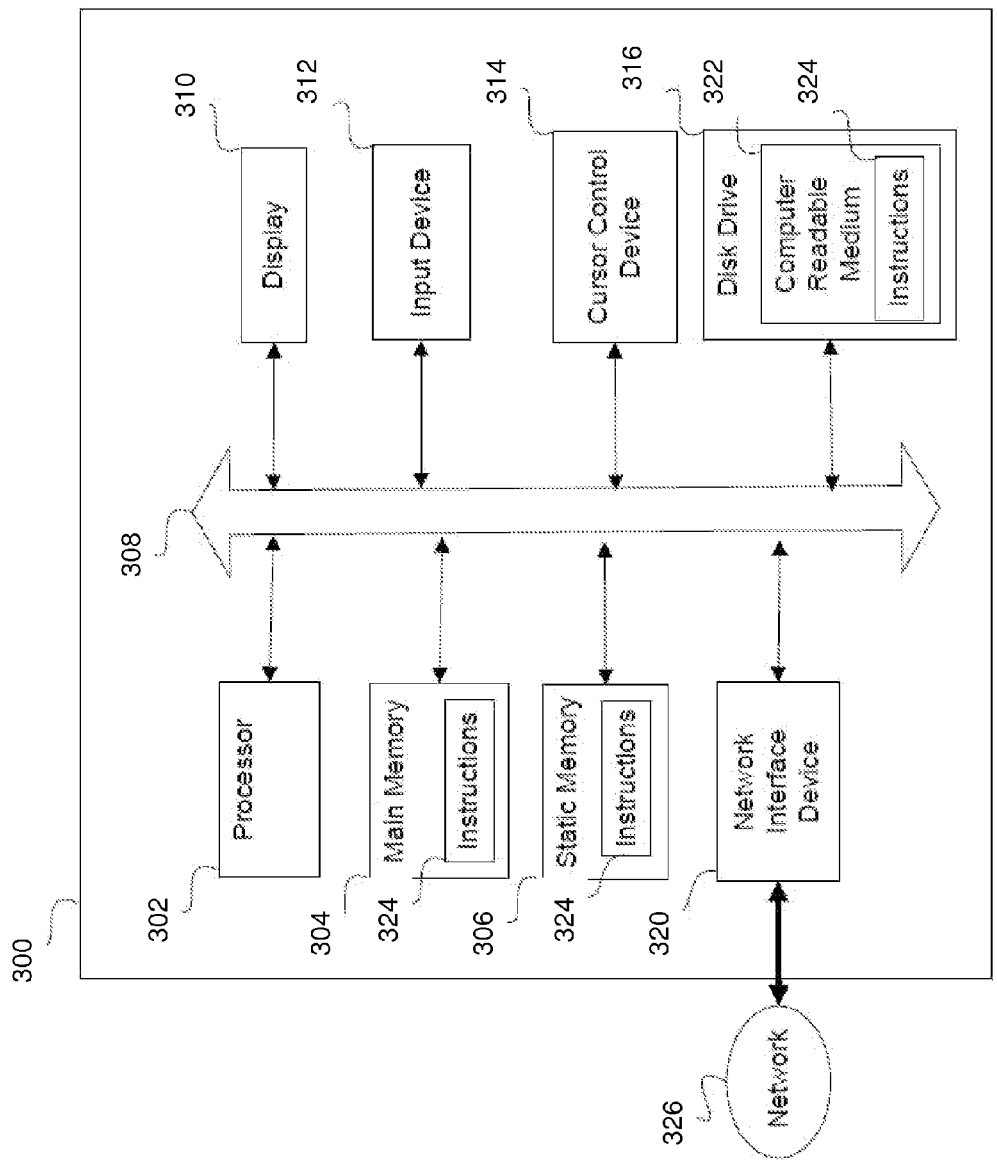
FIG. 3 is a diagram of a general computer system that may be used for one or more of the components shown in FIG. 2.

Referring to FIG. 3, an illustrative embodiment of a general computer system that may be used for one or more of the components shown in FIG. 2, or in any other trading system configured to carry out the methods discussed in further detail above, is shown and is designated 300. The computer system 300 can include a set of instructions that can be executed to cause the computer system 300 to perform any one or more of the methods or computer based functions disclosed herein. The computer system 300 may operate as a standalone device or may be connected, e.g., using a network, to other computer systems or peripheral devices.

In a networked deployment, the computer system may operate in the capacity of a server or as a client user computer in a server-client user network environment, or as a peer computer system in a peer-to-peer (or distributed) network environment. The computer system 300 can also be implemented as or incorporated into various devices, such as a personal computer ("PC"), a tablet PC, a set-top box ("STB"), a personal digital assistant ("PDA"), a mobile device, a palmtop computer, a laptop computer, a desktop computer, a network router, switch or bridge, or any other machine capable of executing a set of instructions (sequential or otherwise) that specify actions to be taken by that machine. In a particular embodiment, the computer system 300 can be implemented using electronic devices that provide voice, video or data communication. Further, while a single computer system 300 is illustrated, the term "system" shall also be taken to include any collection of systems or sub-systems that individually or jointly execute a set, or multiple sets, of instructions to perform one or more computer functions.

As illustrated in FIG. 3, the computer system 300 may include a processor 302, such as a central processing unit ("CPU"), a graphics processing unit ("GPU"), or both. Moreover, the computer system 300 can include a main memory 304 and a static memory 306 that can communicate with each other via a bus 308. As shown, the computer system 500 may further include a video display unit 310, such as a liquid crystal display ("LCD"), an organic light emitting diode ("OLED"), a flat panel display, a solid state display, or a cathode ray tube ("CRT"). Additionally, the computer system 300 may include an input device 312, such as a keyboard, and a cursor control device 314, such as a mouse. The computer system 300 can also include a disk drive unit 316, a signal generation device 318, such as a speaker or remote control, and a network interface device 320.

In a particular embodiment, as depicted in FIG. 3, the disk drive unit 316 may include a computer-readable medium 322 in which one or more sets of instructions 324, e.g., software, can be embedded. Further, the instructions 324 may embody one or more of the methods or logic as described herein. In a particular embodiment, the instructions 324 may reside completely, or at least partially, within the main memory 304, the static memory 306, and/or within the processor 302 during execution by the computer system 300. The main memory 304 and the processor 302 also may include computer-readable media.

In an alternative embodiment, dedicated hardware implementations, such as application specific integrated circuits, programmable logic arrays and other hardware devices, can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

The present disclosure contemplates a computer-readable medium that includes instructions 324 or receives and executes instructions 324 responsive to a propagated signal, so that a device connected to a network 326 can communicate voice, video or data over the network 326. Further, the instructions 324 may be transmitted or received over the network 326 via the network interface device 320.

While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture information communicated over a transmission medium. A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or instructions may be stored.

Although the present specification describes components and functions that may be implemented in particular embodiments with reference to particular standards and protocols commonly used by investment management companies, the invention is not limited to such standards and protocols. For example, standards for Internet and other packet switched network transmission (e.g., TCP/IP, UDP/IP, HTML, HTTP) represent examples of the state of the art. Such standards are periodically superseded by faster or more efficient equivalents having essentially the same functions. Accordingly, replacement standards and protocols having the same or similar functions as those disclosed herein are considered equivalents thereof.

The matter set forth in the foregoing description and accompanying drawings is offered by way of illustration only and not as a limitation. While particular embodiments have been shown and described, it will be apparent to those skilled in the art that changes and modifications may be made without departing from the broader aspects of applicants' contribution. It is therefore intended that the foregoing detailed description be regarded as illustrative rather than limiting, and that it be understood that it is the following claims, including all equivalents, that are intended to define the scope of this invention.

What is claimed is:

1. A computer-implemented method for trading STRIP orders, comprising the following steps:
    receiving, by an exchange computer, a first electronic STRIP order, wherein the first electronic STRIP order is a BUY order;
    receiving, by the exchange computer, a second electronic STRIP order, wherein the second electronic STRIP order is a SELL order;
    matching, by the exchange computer, the first STRIP order with the second STRIP order, wherein the first STRIP order is a contra order to the second STRIP order;
    executing, by the exchange computer, the matched first and second STRIP orders;
    generating, by the exchange computer, a first plurality of tradable component financial product trades based on the executed first STRIP order;
    generating, by the exchange computer, a second plurality of tradable component financial product trades based on the executed second STRIP order;
    matching, by the exchange computer, the first plurality of tradable component financial product trades with the second plurality of tradable component financial product trades, wherein the first plurality of tradable component financial product trades are contra trades to the second plurality of tradable component financial product trades; and
    executing, by the exchange computer, the matched first and second plurality of tradable component financial product trades.

2. The computer-implemented method of claim 1, wherein the first plurality of tradable component financial product trades and the second plurality of tradable component financial product trades comprise at least one of securities orders, options orders, or futures orders.

3. The computer-implemented method of claim 1, wherein the first electronic STRIP order and the second electronic STRIP order are Variance STRIP orders.

4. The computer-implemented method of claim 3, wherein the first and second plurality of tradable component financial product trades are trades for options on a financial index.

5. The computer-implemented method of claim 3, wherein a composition of the first and second plurality of tradable component financial product trades is calculated, in part, using a formula:

$$C_i = \frac{2}{T}\left[\frac{\Delta K_i}{K_i^2}\right]e^{RT} \times \left[\frac{\text{vega notional}}{2 \times \sigma}\right] \times 100$$

wherein,
$\sigma^2$ is a variance (volatility-squared); VIX=$\sigma \times 100$;
T is a time to expiration;
$K_i$ is a strike price of an $i^{th}$ option;
$\Delta K_i$ is an interval between strike prices;
R is a risk-free interest rate to expiration; and
$Q(K_i)$ is a price of an option with strike $K_i$.

6. The computer-implemented method of claim 1, wherein the exchange computer comprises a plurality of computers.

7. An electronic trading system for trading STRIP orders, comprising:
an exchange computer having a memory for storing STRIP order information and a processor; and
wherein the processor is configured to:
receive a first electronic STRIP order, wherein the first electronic STRIP order is a BUY order;
receive a second electronic STRIP order, wherein the second electronic STRIP order is a SELL order;
match the first STRIP order with the second STRIP order, wherein the first STRIP order is a contra order to the second STRIP order;
execute the matched first and second STRIP orders;
generate a first plurality of tradable component financial product trades based on the executed first STRIP order;
generate a second plurality of tradable component financial product trades based on the executed second STRIP order;
match the first plurality of tradable component financial product trades with the second plurality of tradable component financial product trades, wherein the first plurality of tradable component financial product trades are contra trades to the second plurality of tradable component financial product trades; and
execute the matched first and second plurality of tradable component financial product trades.

8. The system of claim 7, wherein the first plurality of tradable component financial product trades and the second plurality of tradable component financial product trades comprise at least one of securities orders, options orders, or futures orders.

9. The system of claim 7, wherein the first electronic STRIP order and the second electronic STRIP order are Variance STRIP orders.

10. The system of claim 9, wherein the first and second plurality of tradable component financial product trades are trades for options on a financial index.

11. The system of claim 9, wherein the processor is configured to calculate a composition of the first and second plurality of tradable component financial product trades, in part, using a formula:

$$C_i = \frac{2}{T}\left[\frac{\Delta K_i}{K_i^2}\right]e^{RT} \times \left[\frac{\text{vega notional}}{2 \times \sigma}\right] \times 100$$

wherein,
$\sigma^2$ is a variance (volatility-squared); VIX=$\sigma \times 100$;
T is a time to expiration;
$K_i$ is a strike price of an $i^{th}$ option;
$\Delta K_i$ is an interval between strike prices;
R is a risk-free interest rate to expiration; and
$Q(K_i)$ is a price of an option with strike $K_i$.

12. The system of claim 7, wherein the exchange computer comprises a plurality of computers.

* * * * *